Figure 1:
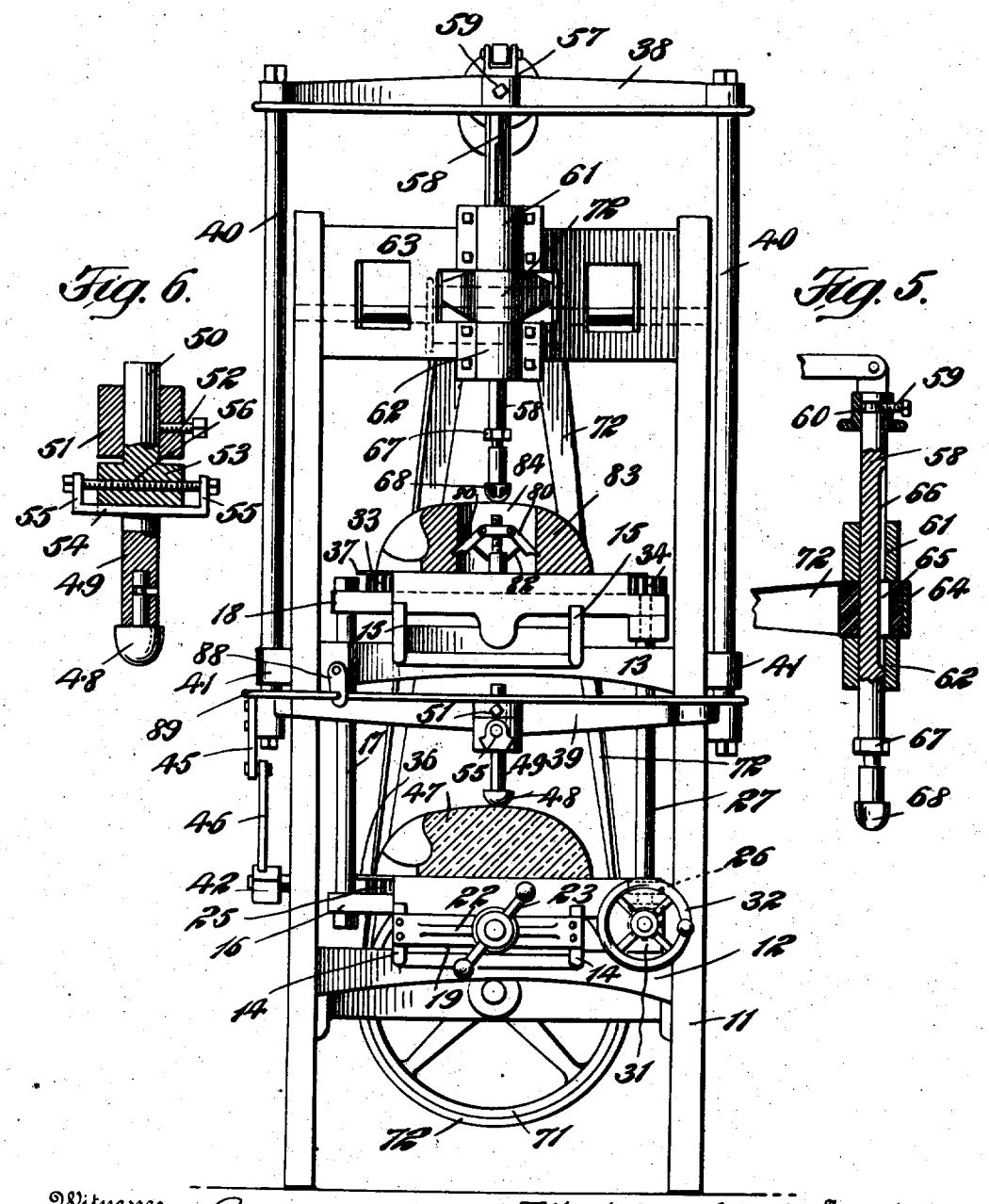

No. 12,827. REISSUED JULY 7, 1908.

M. A. CUMING.

CARVING MACHINE.

APPLICATION FILED DEC. 20, 1907.

3 SHEETS—SHEET 1.

Witnesses
Julius A. Kuh
P. F. Smith

Mari Anna Cuming Inventor
By his Attorney
Fred H. Rowcroft

No. 12,827. REISSUED JULY 7, 1908.

M. A. CUMING.

CARVING MACHINE.

APPLICATION FILED DEC. 20, 1907.

3 SHEETS—SHEET 2.

Witnesses
Julius A. Rich
P. F. Somach

Mari Anne Cuming Inventor
By his Attorney
Fred A. Bowerson

No. 12,827.

REISSUED JULY 7, 1908.

M. A. CUMING.

CARVING MACHINE.

APPLICATION FILED DEC. 20, 1907.

3 SHEETS—SHEET 3.

WITNESSES

Julius Stahl.

P. H. Lomeck.

Mari Anna Cuming INVENTOR

BY

Thos A Bowerscox

ATTORNEY

UNITED STATES PATENT OFFICE.

MARI ANUS CUMING, OF NEW YORK, N. Y.

CARVING-MACHINE.

No. 12,827. Specification of Reissued Letters Patent. Reissued July 7, 1908.

Original No. 867,016, dated September 24, 1907, Serial No. 332,617. Application for reissue filed December 20, 1907. Serial No. 407,441.

*To all whom it may concern:*

Be it known that I, MARI ANUS CUMING, a citizen of the United States, and a resident of the city of New York, borough of Manhattan, county and State of New York, have invented certain new and useful Improvements in Carving-Machines, of which the following is a specification.

This invention relates to machines for duplicating solid shapes or forms, such as the blocks, brims or curls which are employed for forming and finishing hats.

It is well known that felt hats, for example, the different sizes of which are manufactured in large quantities at one time, and the styles or shapes of which are materially changed from time to time, are formed by well-known processes over blocks, generally of wood, which correspond in shape or configuration to the desired form of the hat to be produced or some portion thereof. Large numbers of these blocks are required for each form or shape of hat desired, and, if of wood, are generally first carved to approximately the desired shape and then finished by hand.

The principal object of the present invention is the construction of a carving machine for duplicating these blocks. In other words, I have in view a machine in which, or in connection with which, may be properly mounted a formed block or pattern, and by operation of which a duplicate of said pattern block may be readily, easily and faithfully produced.

I have furthermore in view a machine which will reproduce the exact shape or configuration of pattern block, yet vary in one way or the other the relative size thereof, whereby a relatively larger or smaller block of the same shape may be made through the employment of a single model.

Incidental to the above, I have in view a machine which is comparatively simple in construction, which may be operated under the guidance of a comparatively unskilled attendant, and which is rapid and dependable in operation.

With the above and other ends in view my invention consists in a machine embodying features of construction and operation such as hereinafter described in detail and particularly pointed out in the claims.

Figure 2:
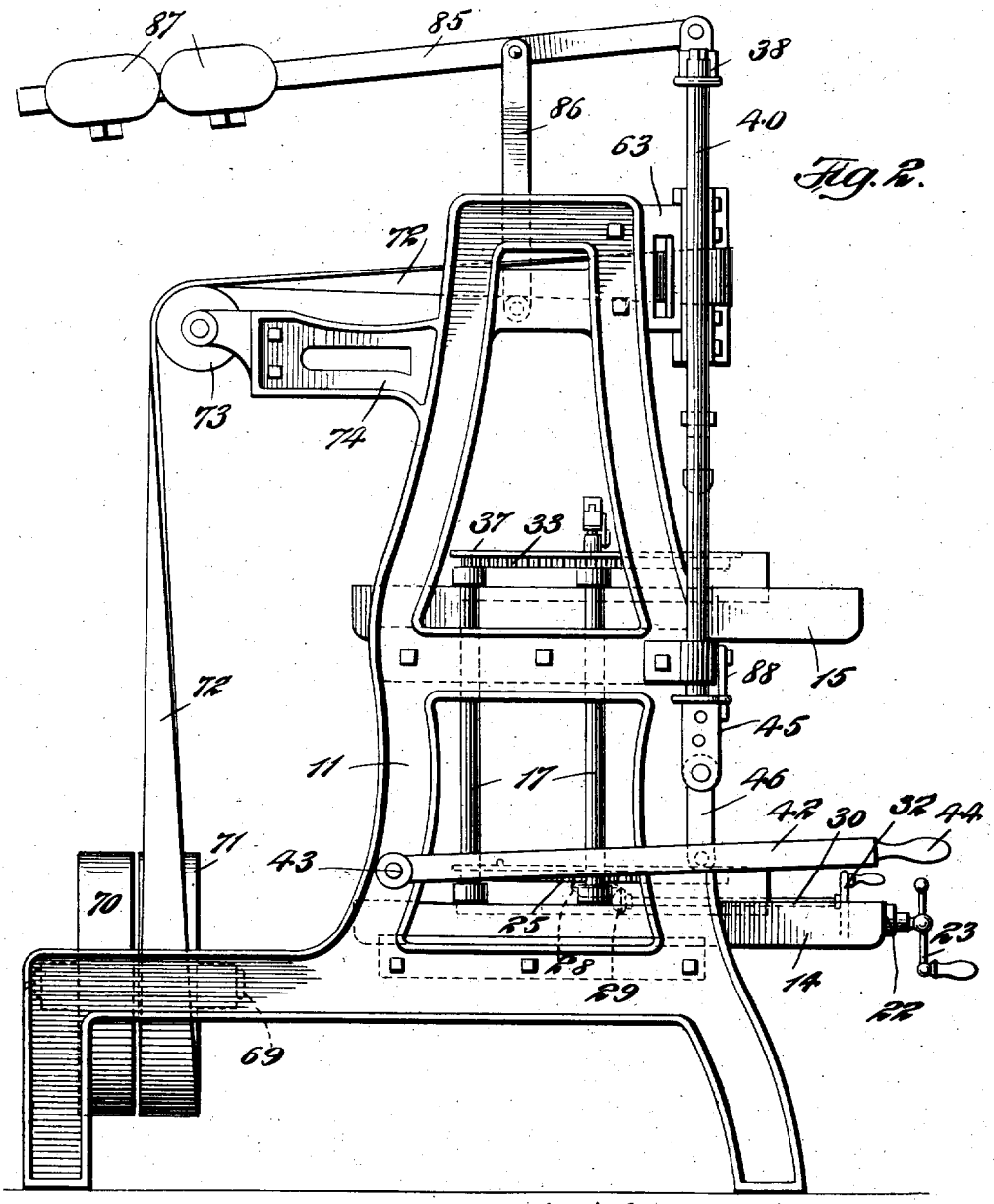
Figure 3:
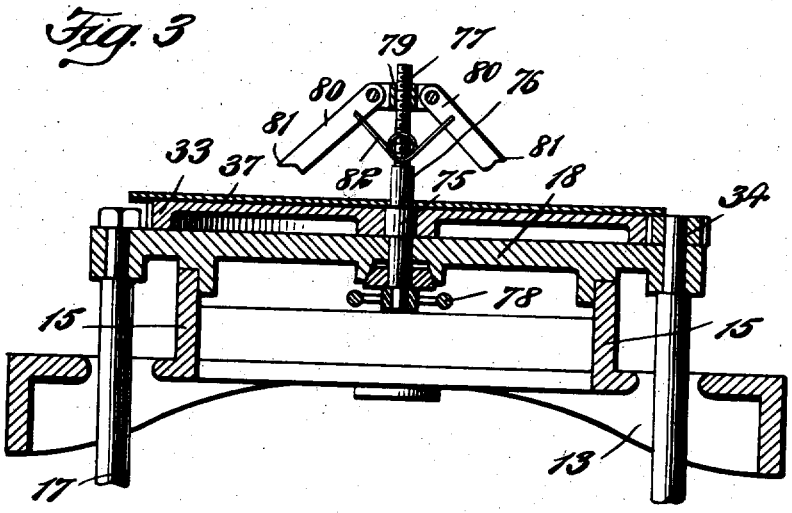
Figure 4:
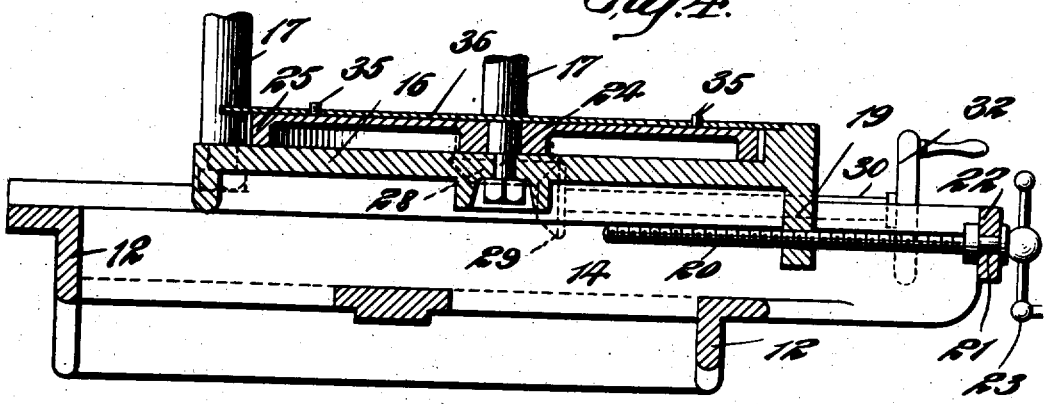

My invention will be more readily understood by reference to the accompanying drawings, forming a part of this specification, in which Figure 1 is a front elevation of a machine embodying my invention; Fig. 2 is a side elevation of the same as seen from the left of Fig. 1; Fig. 3 is an enlarged section through the support for the block to be carved, showing means for clamping the work in position upon the support; Fig. 4 is an enlarged vertical section through the support for the model or pattern block; Fig. 5 is a fragmentary section through the cutter-shaft, to more clearly illustrate the adjustable means for driving the same, and Fig. 6 is an enlarged fragmentary section showing the means for adjusting the tracer, hereinafter described.

Referring now to the drawings in detail, numeral 11, refers to a suitable supporting frame having the lower cross-braces 12 12 and the upper cross-braces 13 13. Upon the lower cross-braces 12 12 are mounted parallel rails or way-bars 14 14, and upon the upper cross-braces 13 13 are mounted the corresponding and similar rails or way-bars 15 15. These two pairs of way-bars support a rigid sliding frame which comprises a lower plate 16, the vertical rods 17 17 and the upper plate 18, both lower and upper plates being provided with grooves or ways which provide slide-bearings for the lower and upper pairs of way-bars, 14 14 and 15 15, respectively, whereby said last mentioned frame, as a whole, is slidable forward and backward with respect to the frame 11.

The plate 16 is provided with a depending lug 19 which has a threaded aperture for the reception of a screw 20, the neck 21 of which is journaled in the cross-bar 22 mounted on the ends of and connecting the lower rails or way-bars 14 14. This screw 20 is rotatable by means of a hand-wheel or crank-lever 23, and, being threaded into the aperture in the lug 19, rotation thereof will serve to move said sliding frame forward and backward along said way-bars. It will be particularly noted that the upper and lower plates, 18 and 16, move in unison.

Lying flat upon the face of the lower plate 16 and having an axle or pivot 24 centrally journaled therein, is the large gear 25, rotated by means of a pinion 26 fixed upon the vertical shaft 27, which is journaled in suitable bearings in the plates 16 and 18. The shaft 27 is rotated by means of a miter-gear 28 thereon in mesh with a corresponding gear 29 upon the horizontal shaft 30. The shaft 30 has bearings in a depending lug 31 on the plate 16 and is provided at its outer or accessible end with a crank-lever or hand-wheel 32. A similar gear 33 is correspondingly revolubly mounted (in a manner hereinafter described) on the plate 18 and meshes with a corresponding pinion 34 on the upper end of the shaft 27. It will now be apparent that rotation of the hand-wheel 32 will rotate the shaft 27 and therewith the pinions 26 and 34, whereby the two gears 25 and 33 will rotate in unison.

The gear 25 is shown provided with bosses 35 fitting into corresponding apertures in a disk-plate 36 superposed thereupon, which plate is, therefore, for purposes of rotation, rigidly connected with said gear 25. In the same or any other suitable manner the disk-plate 37 is rigidly connected with the upper face of the gear 33. These plates 36 and 37 constitute lower and upper working tables, platforms or supports which, as will be now noted, have both a rotary and a longitudinal bodily movement and which, in either case, move in unison.

In addition to the horizontal sliding frame just described, the supporting frame 11 carries a vertically sliding frame comprising upper and lower cross-bars, 38 and 39, respectively, and the vertical rods 40 40. These vertical rods 40 40 are slidable in fixed bearings 41 41 on the frame 11, whereby the frame, of which they form parts, may be raised and lowered with respect to the frame 11. To facilitate this movement and the control thereof, I provide a lever 42 pivoted to the frame 11 at 43, projecting forwardly and terminating in a suitable accessible handle 44. A depending lug or bracket 45 is integral with or suitably affixed to the end of the lower cross-bar 39, between which bracket and said lever 42 is interposed the link 46. The vertically sliding frame being rigildy constructed, it will be apparent that by means of said lever it may as a whole be readily raised and lowered.

Upon the disk-plate 36 may be substantially centrally secured, in any suitable manner, a model block or pattern, such as the block 47 which I have shown in Fig. 1. As preferable means of securing this block, I provide the lower face of the same with sockets or seats for the bosses 35 on the gear 25 which project through the apertures in the plate or support 36. Designed to contact with the surface of this pattern block is the rounded head 48 of the tracer-arm 49 which is rigidly connected with and depends from the cross-bar 39. In order that this tracer-arm 49 and its head 48 may be made adjustable, I prefer to provide a stem 50 in bearing in an enlarged portion 51 which forms a collar in the cross-bar 39, this stem being fixed in said bearings by means of the screw-bolt 52. I provide this stem 51 with a disk-head 53 at its lower end, the lower face of which has a dove-tail groove in which rides a slide 54 secured to or integral with the arm 49. The slide 54 has the upturned ears 55 55 in which the small shaft 56 is journaled, said shaft being threaded into and through the head 53. It will thus be apparent that by unscrewing the bolt 52, the stem 50 may be rotated or raised or lowered, and by turning the shaft 56, the tracer-arm 49 with its head 48 may be laterally adjusted.

The upper cross-bar 38 of said vertically sliding frame is provided with a corresponding enlarged portion 57, within which is journaled the upper end of a revoluble shaft 58 which revolves freely in its bearings in which it is retained by means of the bolt 59 entering the annular grooves 60 in the upper end of said shaft. This shaft also has bearings 61 and 62 which are suitably provided in the bracket or cross-brace 63 carried by the uprights of the main frame 11. Between these bearings 61 and 62, the shaft 58 is provided with a pulley 64 which is fixed to said shaft for purposes of rotation and yet vertically slidable on said shaft through the provision of a spline 65 on said pulley fitting within the spline-way 66 in said shaft. At the lower end of the shaft 58, I provided a clamp 67 by means of which I removably secure the bit or rotary cutting tool 68. It is intended that the position of the end of this cutting-tool 68, with respect to the upper disk or table 37, shall exactly correspond to the position of the head 48 of the tracer-arm 49 with respect to the lower disk or table 36.

In a rearward extension of the main frame 11, I provide bearings for a short shaft 69 upon which are mounted the pulleys 70 and 71. The pulley 70 is designed to be connected with any suitable source of power, and rotates the shaft 69 and therewith the pulley 71. The pulley 71 drives the belt 72, which extends upwardly over idlers 73 73, suitably mounted upon the rearwardly-projecting bracket 74, and around the pulley 64 on the shaft 58. By this means the shaft 58 may be rapidly rotated and therewith the cutting tool 68, while, at the same time, said shaft 58 will slide vertically in the bearings 61 and 62 upon vertical movement of the sliding frame to which it is secured.

Upon the upper disk or platform 37 is designed to be suitably secured the block from which it is desired to cut a duplicate of the pattern which is rigidly mounted upon the lower disk or table 36. As a preferred means of securing the block to be formed to the table 37, instead of providing the gear 33 with an axle or pivot journaled in the plate 18, said gear is centrally apertured for a bearing sleeve 75 which turns upon a hollow shaft 76 therein. This hollow shaft 76 is internally threaded for the reception of a screw 77 which is provided at its lower end with a turning-handle or hand-wheel 78. On the upper end of the screw 77 is mounted a nut 79 in which are pivoted the ends of the oppositely disposed levers 80 80 having claws 81 81 at the other ends thereof. These levers 80 80 are tensioned relatively to each other by a spring 82, interposed therebetween, which tends to spread said levers apart. The work-block, such as I have indicated by the numeral 83, in Fig. 1, is provided with a central bore or opening 84, slightly less in diameter than the normal distance between the claws at the ends of the levers 80 80. It will now be apparent that when the work block 83 is placed upon the upper plate or table 18, the sides of the bore 84 will slightly depress the ends of the levers 80 80 and force the same toward each other and against the action of the spring 82. The handle or hand-wheel 78 may now be turned and will operate through the screw 77 to force the latter downward, but owing to the force of the spring 82, the claws 81 81 bite the sides of the bore 84 so that depression of said screw tends to force the levers 80 80 apart and draw the work-block 83 toward the plate 18 to firmly and rigidly secure the same thereon.

The pattern-block 46 and the work-block 83 now occupy substantially identical relative positions on the plates 16 and 18, respectively, while the tracer arm 49 and the cutting tool 68 are correspondingly positioned with respect to the pattern and work blocks, respectively. The former may, in the manner suggested be adjusted to correct any slight discrepancy. It will now be apparent that the cutting tool 68 will identically follow the vertical movements of the tracer arm 49, while the work-block 83 will identically follow the lateral and rotary movements of the pattern block 46. Means for easily and readily effecting these movements having been described, it will now be clear that the rounded head 48 of the tracer arm 49 may be made to follow the configuration of the upper surface of the pattern-block 46, which effects precisely similar coöperative movements between the edges of the cutting tool 68 and the work-block 83. In this manner the work-block may be carved by said cutting tool to the identical shape of the pattern block.

The vertically sliding frame which carries the tracer arm and the cutting tool, is naturally heavy, and, therefore, more or less difficult to raise and lower. To facilitate the manipulations of this frame, I prefer to provide a lever 85, which is suitably pivoted at the middle of the upper cross-bar 40 of said frame and to one end of a link 86, the other end of which is suitably pivoted to the frame 11. At the free end of the lever 85, there may be removably and adjustably mounted weights 87 87 to approximately counterbalance the weight of said frame and provide for the raising and lowering of the latter with the least possible exertion.

In order to suspend and lock the vertically sliding frame when the machine is idle, I provide a hook 88 suitably pivoted to the forward upper cross-brace 13 and adapted to engage either the flange 89, with which I have shown the lower cross-bar 41 provided, or, in the absence of such flange, this hook may obviously engage a pin suitably mounted upon said cross-bar. In this manner the vertically sliding frame may be retained in a suspended position, with both the tracer-arm and the cutting tool non-interferent with the mounting and adjustment of the pattern and work blocks.

Particular attention is called to the fact that through the means I have shown and described for both vertically and laterally adjusting the tracer arm 49, the relative elevation of the head of said tracer-arm above the plate or table 36, as compared with the elevation of the edge of the cutting tool 68 above the plate or table 37, may be varied, and further, said tracer-arm 49 may be located off-center with respect to the cutting tool 68, whereby blocks of identically the same configuration although of varying comparative sizes may be carved through the employment of the same pattern-block. This is considered an important feature of my invention, inasmuch as blocks must be provided for the different sizes of hats conforming to the same general style.

Many modifications of minor details of my improved carving machine will doubtless readily suggest themselves to those skilled in the art to which it appertains, and I therefore do not desire to limit my invention to the specific construction herein shown and described.

I claim as new and desire to secure by Letters Patent:

1. In a machine of the character described, the combination, with suitable supporting means, of a rigid frame slidable therein and provided with a pattern support and a work support rotatable in said frame, another sliding frame carrying a pattern tracer and a carving tool, the former being located in coöperative positional relation to said pattern support and the latter being correspondingly positioned with respect to said work support, means for sliding said frames and for rotating said supports in unison, and means for operating said carving tool.

2. In a machine of the character described, the combination, with suitable supporting means, of a frame horizontally sliding therein and provided with a pattern support and a work support, both rotatable in unison by actuating means common to both, a vertically sliding frame carrying a pattern tracer and a carved tool, the former being located in coöperative positional relation to said pattern support and the latter being correspondingly positioned with respect to said work support, means for sliding said frames to preserve a constantly proportionate positional relationship between the co-acting parts of each, and means for operating said carving tool.

3. In a machine of the character described, the combination, with suitable supporting means, of a frame horizontally slidable therein and provided with an upper and a lower support, said supports being rotatable in unison by the same actuating means, a vertically sliding frame carrying a pattern tracer and a carving tool, the former being located in cooperative positional relation to one of said supports and the latter being correspondingly positioned with respect to the other support, means for sliding said frames to preserve a constantly proportionate positional relationship between the co-acting parts of each, and means for operating said carving tool.

4. In a machine of the character described, the combination, with suitable supporting means, of a frame horizontally slidable therein and provided with an upper and a lower support, both rotatable in unison by actuating means common to both, a vertically sliding frame carrying a pattern tracer and a carving tool, the former being located in cooperative positional relation to said lower support and the latter being correspondingly positioned with regard to said upper support, means for sliding said frames and rotating said supports to preserve a constantly proportionate positional relationship between the co-acting parts, and means for operating said tool.

5. In a device of the character described, comprising a main frame provided with ways, a sub-frame supported by said main frame and engaging said ways, a revoluble member controllable by hand for moving said sub-frame, relatively to said main frame, turntables provided with gear teeth and mounted one upon the upper portion of said sub-frame and the other upon the lower portion thereof, gear pinions engaging said gear teeth, a revoluble shaft connecting said gear pinions together, means controllable by hand for turning said revoluble shaft, so as to rotate said turntables, mechanism for securing a pattern block upon one of said turntables, means for holding a work block upon the other of said turntables, a tracer for engaging said pattern block, a cutter for engaging said work block, connections from said cutter to said tracer for enabling said tracer to guide said cutter, and means controllable at will for moving said cutter in either of two directions relatively to said work block.

6. The combination of a framework provided with an upper deck and with a lower deck, a turntable mounted upon said upper deck, another turntable mounted upon said lower deck, said turntables being provided with gear teeth, gear pinions engaging said gear teeth of said turntables, a revoluble shaft connecting said gear pinions together a hand-wheel provided with means for turning said revoluble shaft so as to rotate said turntables, mechanism for securing a pattern block upon one of said turntables, means for securing a work block upon the other of said turntables, a tracer for engaging the surface of said pattern block, a cutter for engaging the surface of said work block, connections from said tracer to said cutter, and means for actuating said cutter.

7. A device of the character described, comprising a main frame provided with ways, a sub-frame supported by main frame and engaging said ways, a revoluble member controllable by hand for moving said sub-frame, relatively to said main frame, turntables provided with gear teeth and mounted one upon the upper portion of said sub-frame and the other upon the lower portion thereof, gear pinions engaging said gear teeth, a revoluble shaft connecting said gear pinions together, means controllable by hand for turning said revoluble shaft, so as to rotate said turntables, and mechanism for securing a pattern block upon one of said turntables.

8. The combination of a framework provided with an upper deck and with a lower deck, a turntable mounted upon said upper deck, another turntable mounted upon said lower deck, said turntables being provided with gear teeth, gear pinions engaging said gear teeth of said turn-tables, a revoluble shaft connecting said gear pinions together, and a hand wheel provided with means for turning said revoluble shaft so as to rotate said turntables.

9. A device of the class described comprising a main frame provided with ways, a sub-frame supported by said main frame and engaging said ways, a revoluble member controllable by hand for moving said sub-frame relatively to said main frame, an upper and a lower deck mounted upon said frame, turntables mounted one upon said upper deck and the other upon said lower deck, means for actuating said turntables by hand, means for holding a work block upon one of said turntables and a pattern block upon the other of said turntables, and mechanism controllable by said pattern block for cutting said work block.

In testimony of the foregoing, I have hereunto set my hand in the presence of two subscribing witnesses.

MARI ANUS CUMING

Witnesses:

L. M. PHILLIPS,

P. F. SORNNEK.